United States Patent Office 2,843,595
Patented July 15, 1958

2,843,595

PYRIDYL-BROMOBENZYL-DIALKYL DIAMINES

Hermann Engelhard, Gottingen, Karl Credner, Berlin-Frohnau, and Gerhard Renwanz, Berlin-Tegel, Germany, assignors to Veritas Drug Company Limited, Shrewsbury, England, a British company No Drawing. Application August 10, 1955
Serial No. 527,652

Claims priority, application Germany August 12, 1954

3 Claims. (Cl. 260—296)

This invention relates to pyridyl-bromobenzyl-dialkyl diamines.

The novel pyridyl-bromobenzyl-dialkyl-ethylene diamines of the present invention are compounds of the general formula:

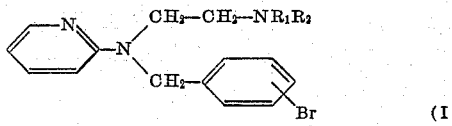

in which $R_1$ is an ethyl group and $R_2$ is a methyl or ethyl group.

N - (2 - pyridyl) - N - p - bromobenzyl - N'.N' - dimethyl-ethylene diamine, i. e. a compound of the general Formula I, in which $R_1$ and $R_2$ are each a methyl group and the bromine is joined to the ring in the para position, is known as an anti-histaminic. It is also known that this compound has a local anaesthetic effect.

It has now been found that as compared with this known pyridyl-bromobenzyl-dialkyl diamine, the action of the novel compounds of the general Formula I as a local anaesthetic is considerably strengthened and in some cases the anti-histaminic activity is weakened. For example, the efficacy of N-(2-pyridyl)-N-m-bromobenzyl-N'.N'-diethyl-ethylene diamine as a local anaesthetic is 5.49 times greater than that of procaine.

This result is surprising, since it could be assumed from opinions expressed in the literature that the effect as a local anaesthetic and the anti-histaminic effect run parallel with one another. Pharmacological comparison of the known N - (2 - pyridyl) - N - p - bromobenzyl-N'.N'-dimethyl-ethylene diamine (Hibernon) gave the following results:

|  | Antihistaminic activity (determined according to Schild) | Anaesthesia on the cornea of a rabbit (Procaine=1) |
|---|---|---|
| $R_1$=CH$_3$; $R_2$=CH$_3$; $R_3$=p-bromobenzyl | 5.96×10$^{-9}$ | 2.16 |
| $R_1$=C$_2$H$_5$; $R_2$=C$_2$H$_5$; $R_3$=p-bromobenzyl | 1.0×10$^{-6}$ | 2.61 |
| $R_1$=C$_2$H$_5$; $R_2$=C$_2$H$_5$; $R_3$=o-bromobenzyl | 1.59×10$^{-6}$ | 3.27 |
| $R_1$=C$_2$H$_5$; $R_2$=C$_2$H$_5$; $R_3$=m-bromobenzyl | 0.89×10$^{-7}$ | 5.49 |
| $R_1$=CH$_3$; $R_2$=C$_2$H$_5$; $R_3$=p-bromobenzyl | 8.20×10$^{-9}$ | 6.2 |
| $R_1$=CH$_3$; $R_2$=C$_2$H$_5$; $R_3$=m-bromobenzyl | 1.35×10$^{-8}$ | 5.4 |

The novel compounds may be prepared according to various processes.

Thus, the present invention includes a process for the manufacture of the novel compounds of the general Formula I wherein a 2-(β-dialkyl-aminoethyl-amino)-pyridine is reacted with the hydrobromic acid ester or other ester of a bromobenzyl alcohol in the presence of an alkali metal amide as a condensing agent.

The present invention also includes a process for the manufacture of the novel compounds of the general Formula I wherein 2-aminopyridine is reacted with an alkali metal amide and a bromobenzyl halide or with a bromobenzaldehyde and formic acid, and the 2-(N-bromobenzylamino)-pyridine formed is then reacted with a diethyl-aminoethyl halide or a methylethyl-aminoethyl halide.

The present invention further includes a process for the manufacture of the novel compounds of the general Formula I wherein 2-bromopyridine can also be reacted in the presence of pyridine or powdered copper with a bromobenzyl-diethyl-ethylene diamine, or with a bromobenzyl-methyl-ethyl-ethylene diamine.

The following examples illustrate the invention:

Example 1

A solution of 193 g. of 2-(β-diethyl-aminoethyl-amino)-pyridine in about 500 cc. of toluene was added dropwise and while stirring to a suspension of 40 g. of sodium amide in about 40 cc. of toluene, the mixture being heated for 3 hours at 100° C., thereafter cooled to 45° C., and a slightly heated solution of 125 g. of m-bromobenzyl bromide in about 125 cc. of toluene was then added dropwise. When the latter had been added, the reaction mixture was again heated to about 100° C. and maintained at this temperature for 4 hours. It was then cooled to room temperature, mixed with excess hydrochloric acid and thoroughly shaken. The toluene layer was separated, while the aqueous layer was saturated with potassium carbonate and shaken with ether. After being dried over caustic soda, the ether was distilled off and the brown oil which remained was fractionated in vacuo. There was obtained a first running of about 92 g. which consisted essentially of diethyl-aminoethyl-aminopyridine. There were then obtained about 155 g. of N-(2-pyridyl)-N-m-bromobenzyl-N'.N'-diethyl-ethylene diamine as a light yellow viscous oil with a boiling point of 210° C./1 mm. Hg. The base formed a perchlorate (M. P.=88° C.) which was sparingly soluble in water and which was obtained from the aqueous solution of the monohydrochloride and sodium perchlorate solution. The maleate (M. P.=110° C.) was moderately soluble in water. N-(2-pyridyl)-N-m-bromobenzyl-N'.N'-diethyl-ethylene diamine can be used satisfactorily on the skin and is very effective as a local anaesthetic. It is suitable for the treatment of pruritis.

Example 2

40 g. of sodium amide were added in small portions and while stirring well to a solution of 263 g. of 2-(N-o-bromobenzylamino)-pyridine (prepared by heating 2-aminopyridine with o-bromobenzaldehyde in formic acid or by heating o-bromobenzyl bromide with 2-aminopyridine in the presence of sodium carbonate or sodium amide) in 200 cc. of absolute toluene. The said solution was heated to about 80° C. The mixture was thereafter maintained at 100° C. for about 3 hours, then cooled to about 45° C. and a solution of 108 g. of β-diethylaminoethyl chloride in 480 cc. of toluene was then added dropwise. After the solution had been added, the reaction mixture was again heated to 100° C. and kept at this temperature for 4 hours. Working up was carried out as in Example 1. N-(2-pyridyl)-N-o-bromobenzyl-N'.N'-diethyl-ethylene diamine was obtained with practically the same boiling point as the base obtained according to Example 1. The easily water-soluble hydrochloride melts at 145° C. It is obtained from the methanolic solution of the base by addition of the calculated amount of methanolic hydrochloric acid and ether.

Example 3

A mixture of 285 g. of N-diethyl-N'-(p-bromobenzyl)-ethylene diamine (prepared by boiling an alcoholic solution of β-diethylamino-ethyl chloride with excess p- bromobenzylamine), 158 g. of 2-bromopyridine and 80 g. of absolute pyridine were heated for one day in an autoclave at about 160° C. After being worked up as in the previous examples, N - (2 - pyridyl) - N - p - bromobenzyl-N'.N'-diethyl-ethylene diamine was obtained as a light yellow viscous base with a boiling point of 210° C./1 mm. Hg, the perchlorate of which (M. P.=123° C.) is sparingly soluble in water. The maleate (M. P.=115° C.) and the citrate (M. P. 127° C.) are only moderately soluble.

*Example 4*

By employing instead of the 2-(β-diethylamino-ethylamino)-pyridine of Example 1 the corresponding methyl-ethyl base, namely 2-(β-methyl-ethylamino-ethylamino)-pyridine and proceeding as in Example 1, N-(2-pyridyl)-N - m - bromobenzyl - N' - methyl - N' - ethyl - ethylene diamine was obtained as a clear yellow viscous oil which boiled at 185° C./1 mm. Hg and formed with maleic acid an acid salt of melting point 106° C.

*Example 5*

By substituting the m-bromobenzyl bromide used in Example 4 by the para compound, N-(2-pyridyl)-N-p-bromobenzyl - N' - methyl - N' - ethyl - ethylene diamine was obtained as a clear yellow viscous base boiling at 190° C./1 mm. Hg and formed an acid maleate of melting point 108° C. and a perchlorate of melting point 147° C. N-(2 - pyridyl) - N - p - bromobenzyl - N' - methyl - N'-ethyl-ethylene diamine is a novel highly effective compound with good anti-histaminic properties and pronounced local anaesthesia with reduced toxicity as compared with N - (2 - pyridyl) - N - p - bromobenzyl-N'.N'-dimethyl-ethylene diamine.

What we claim is:

1. A compound selected from the group consisting of N - (2 - pyridyl) - N - m - bromobenzyl - N'.N' - diethyl-ethylene diamine and N-(2-pyridyl)-N-m-bromobenzyl-N'-methyl-N'-ethyl-ethylene diamine.

2. The compound N - (2 - pyridyl) - N - m - bromobenzyl-N'.N'-diethyl-ethylene diamine.

3. The compound N - (2 - pyridyl) - N - m - bromobenzyl-N'-methyl-N'-ethyl-ethylene diamine.

References Cited in the file of this patent

UNITED STATES PATENTS

| | | |
|---|---|---|
| 2,406,594 | Djerassi et al. | Aug. 27, 1942 |
| 2,569,314 | Howard | Sept. 25, 1951 |
| 2,572,569 | Howard | Oct. 23, 1951 |
| 2,585,239 | Granatek | Feb. 12, 1952 |
| 2,607,778 | Phillips et al. | Aug. 19, 1952 |
| 2,727,898 | Grant et al. | Dec. 20, 1955 |

FOREIGN PATENTS

| | | |
|---|---|---|
| 651,596 | Great Britain | Apr. 4, 1951 |